(12) United States Patent
Agarwal et al.

(10) Patent No.: US 10,880,168 B2
(45) Date of Patent: Dec. 29, 2020

(54) SWITCH CONFIGURATION

(71) Applicant: Hewlett Packard Enterprise Development LP, Houston, TX (US)

(72) Inventors: Vivek Agarwal, Andover, MA (US); Rupin Mohan, Andover, MA (US); Krishna Puttagunta, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 37 days.

(21) Appl. No.: 16/088,276

(22) PCT Filed: Apr. 1, 2016

(86) PCT No.: PCT/US2016/025562
§ 371 (c)(1),
(2) Date: Sep. 25, 2018

(87) PCT Pub. No.: WO2017/171836
PCT Pub. Date: Oct. 5, 2017

(65) Prior Publication Data
US 2020/0052968 A1  Feb. 13, 2020

(51) Int. Cl.
*H04L 12/00* (2006.01)
*H04L 12/24* (2006.01)
*H04L 12/931* (2013.01)

(52) U.S. Cl.
CPC ...... *H04L 41/0843* (2013.01); *H04L 41/0806* (2013.01); *H04L 49/357* (2013.01)

(58) Field of Classification Search
CPC ....... G08C 17/02; H04L 29/08; H04L 12/282; G06F 3/0416; G06F 9/452; G06F 9/445; G06F 3/04817
USPC .......................................................... 709/227
See application file for complete search history.

(56) References Cited

U.S. PATENT DOCUMENTS 6,215,786 B1    4/2001 Larson et al.
6,813,268 B1 *  11/2004 Kalkunte .............. H04L 69/161
                                                    370/392
6,898,202 B2    5/2005 Gallagher et al.
(Continued)

FOREIGN PATENT DOCUMENTS

CN      101094099 A    12/2007
CN      103023707 A     4/2013
KR    20120132826 A    12/2012

OTHER PUBLICATIONS

Cisco, "Initial Configuration," Cisco MDS 9000 Family CLI Configuration Guide, Chapter 5, http://www.cisco.com, 42 pages.
(Continued)

*Primary Examiner* — Frantz Coby
(74) *Attorney, Agent, or Firm* — Trop, Pruner & Hu, P.C.

(57) ABSTRACT

In one example, provide a plurality of initial switch configuration templates associated with network switches, establishing a link with a network switch comprising a connection with a principal port of the network switch, select from the plurality of initial switch configuration templates an initial switch configuration template associated with the network switch device, and transmit to the network switch device, through the principal port, an in-band command with the selected initial switch configuration template.

20 Claims, 5 Drawing Sheets

(56) References Cited

U.S. PATENT DOCUMENTS

| | | | |
|---|---|---|---|
| 7,174,371 B2 * | 2/2007 | Elo | H04L 41/0803 709/220 |
| 7,246,163 B2 * | 7/2007 | Tindal | H04L 41/0226 707/999.01 |
| 7,339,938 B2 * | 3/2008 | Tzeng | H04L 12/5601 370/389 |
| 7,411,915 B1 | 8/2008 | Spain et al. | |
| 7,542,572 B2 * | 6/2009 | Meier | H04W 12/04031 380/277 |
| 7,593,403 B2 * | 9/2009 | Kalkunte | H04L 49/351 370/386 |
| 7,631,055 B1 * | 12/2009 | Stamler | G06Q 10/087 709/220 |
| 7,715,328 B2 * | 5/2010 | Ambe | H04L 12/4645 370/245 |
| 7,720,940 B1 * | 5/2010 | Wilsey | H04L 41/0843 709/220 |
| 7,792,104 B2 * | 9/2010 | Tzeng | H04L 12/5601 370/389 |
| 8,108,673 B2 * | 1/2012 | Frazier | H04L 63/08 713/168 |
| 8,565,118 B2 * | 10/2013 | Shukla | H04L 41/0806 370/254 |
| 8,817,664 B2 * | 8/2014 | Black | H04L 12/4641 370/254 |
| 8,924,524 B2 * | 12/2014 | Dalal | H04L 61/2007 709/222 |
| 9,130,835 B1 | 9/2015 | White et al. | |
| 9,432,254 B1 * | 8/2016 | Naqvi | H04L 41/084 |
| 2002/0085585 A1 * | 7/2002 | Tzeng | H04L 12/5601 370/475 |
| 2004/0081104 A1 | 4/2004 | Pan et al. | |
| 2005/0122825 A1 * | 6/2005 | Tzeng | H04L 12/5601 365/230.05 |
| 2007/0162592 A1 | 7/2007 | Marks | |
| 2012/0311120 A1 | 12/2012 | Yasuda et al. | |
| 2014/0010096 A1 | 1/2014 | Kamble et al. | |
| 2015/0271010 A1 | 9/2015 | Shetty et al. | |
| 2016/0050116 A1 * | 2/2016 | Sheshadri | H04L 41/0843 709/221 |

OTHER PUBLICATIONS

International Search Report & Written Opinion received in PCT Application No. PCT/US2016/025562, dated Dec. 26, 2016, 12 pages.

Brocade Communications Systems, Inc., "SAN Fabric Administration Best Practices Guide Support Perspective," May 2015, 24 pages.

Oracle, "SAS Domain Access Configuration," available online at <https://web.archive.org/web/20140412000819/https://docs.oracle.com/cd/E19377-01/821-1362-10/saszoning_overview.html>, Sun Storage Common Array Manager Installation and Setup Guide, Ch. 7, Apr. 12, 2014, 26 pages.

* cited by examiner

SWITCH CONFIGURATION

BACKGROUND

Computer networks may include network switch devices to provide communication paths between network host devices and network storage devices. The computer networks may allow physical storage devices to appear as virtual storage space to the network host devices.

BRIEF DESCRIPTION OF THE DRAWINGS

Examples are described in the following detailed description and in reference to the following drawings.

DETAILED DESCRIPTION

Figure 1:
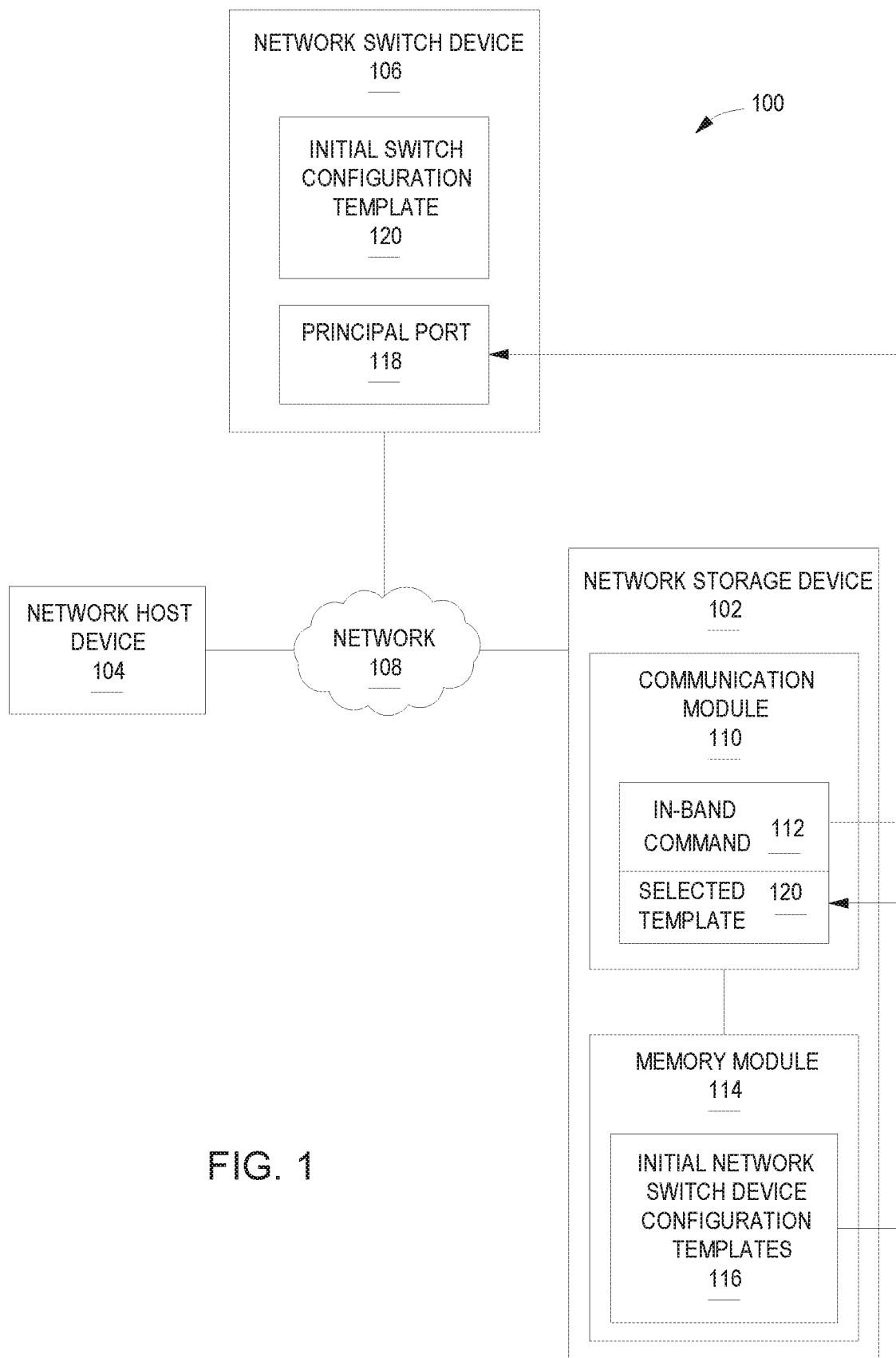
FIG. 1 depicts an example system for switch configuration of network switch devices.

Computer networks may include network switch devices (switches) to provide links or communication paths between network host devices (initiators) and network storage devices (targets). The computer networks allow physical storage space of the network storage devices to appear as virtual storage space to the host devices.

The network switch devices may be required to be configured to provide links or communication paths between the network host devices and the network storage devices. The network host devices may communicate through the switches and over a network to access the network storage devices that provide for storage of data and for later retrieval of the data. The network switch devices may be manually configured based on the capabilities of the switch devices. However, in large computer networks with many network switch devices, configuration of the switch devices may be time consuming and error prone which may decrease the performance of the computer networks.

In one example, the present techniques may provide for switch configuration of the network switch devices which may help improve the performance of computer networks. In one example, disclosed is a network storage device that includes a communication module to communicate and configure a network switch device over a principal port using in-band communication techniques. The network storage device establishes a link or communication path with the network switch device that includes a connection with a principal port of the network switch device. The network storage device selects, from a plurality of initial switch configuration templates, an initial switch configuration template associated with the network switch device. The network storage device transmits, to the network switch device through the principal port, an in-band command with the selected initial switch configuration template. In one example, in response to receipt of an acknowledgment from the network switch, after successful transmission and confirmation of the template to the network switch device, the network storage device may cause the network switch device to establish a link to allow communication over a network between a network host device and the network storage device over a network.

In this manner, the present techniques may help improve the process of configuration of network switch devices to be less time consuming and less error prone. In one example, these techniques may help improve the process of configuration of network switches and help reduce any potential computer network problems such as downtime of the network which is undesirable. These techniques may also help allow users of the system, such as administrators, to customize configuration templates and thereby help increase introduction or integration of new or replacement network switch devices into computer networks.

In other examples, these present techniques may help provide a push model of operation where configuration information is pushed or initiated from network storage devices (targets) to network switch devices (switches) instead of the information being pulled or requested from network storage devices. The push model of operation may allow for central control and management of network switch devices and network storage devices. These techniques may allow for network storage device orchestrated initial network switch device configuration using in-band communication techniques which may reduce the need for manual user or administrator intervention or additional/complex scripts or installation of any management agents. These techniques may help provide in-band network storage device (target) based orchestrated configuration control and enforcement of computer network components such as network switch devices. These techniques may help enable plug and play process to replace faulty switch devices since the switch configuration information is stored on network storage devices (target). These techniques may help enable single point of configuration of network switch devices from network storage devices which may help provide for organization policy or regulatory enforcement of the network switch devices. Therefore, these techniques may help improve performance of computer networks.

FIG. 1 depicts an example system 100 for switch configuration. The system 100 includes a computer network 108 with a network storage device 102 (target), a network host device 104 (initiator) and a network switch device 106 (switch) to be coupled for communication over the network. As explained below in further detail, in one example, network storage device 102 may include functionality for switch configuration of network switch device 106 which may help to make configuration of network switch devices less time consuming and less error prone and thereby help improve performance of network 108. It should be understood that system 100 is for illustrative purposes and that different configurations may be employed to practice the present techniques. For example, system 100 may include a plurality of computer networks 108, network storage devices 102, network host devices 104 and network switch devices 106 to practice the present techniques.

In one example, network storage device 102 includes a memory module 114 to store a plurality of initial switch device configuration templates 116 associated with network switch devices 106. Each of the initial switch device configuration templates 116 includes information to configure respective network switch devices 106. The memory module 114 may comprise any means of storing data for later retrieval such as processor readable medium as described below in detail.

The network storage device 102 includes a communication module 110 to communicate with network switch device 106 over computer network 108. In one example, communication module 110 may provide for control or management of operation of network storage device 102 such as control of access of data stored on the network storage device. In another example, communication module 110 is configured to select a template 120 from plurality of configuration templates 116 and transmit the selected template 120 to network switch device 106 to configure the network switch device, as explained below in further detail. In one example, communication module 110 is configured to provide for storage of data for later retrieval by network host device 104 through network switch device 106.

In one example, network storage device 102 may be configured to establish a link or communication path with network switch device 106 which comprises a connection with principal port 118 of the network switch device. The network storage device 102 selects, from initial switch device configuration templates 116, an initial switch configuration template 120 associated with network switch device 106. The network storage device 102 transmits to network switch device 106, through principal port 118, an in-band command 112 with the selected initial switch configuration template 120. In another example, in response to receipt of an acknowledgment from network switch device 106, after transmission of template 120 to the network switch device, network storage device 102 may cause the network switch device to execute a configuration process to load the configuration template and operate according to the configuration template. In another example, network switch device may automatically begin to operate in accordance with the configuration template and respond accordingly to the network storage device 102. In another example, network switch device 104 may receive a separate command from network storage device 102 to operate in accordance to the configuration template and respond with a status to the network storage device 102. Once the network switch 106 is configured, a link is established to allow communication over network 108 between network host device 104 and the network storage device. In another example, the establishment of the link for communication over network may also allow for communication of other network host devices 104 with other network storage devices 102 over network 108.

In another example, network storage device 102 may be configured to respond to a replacement of network switch device 106 with a replacement switch device. In this case, network storage device 102 can detect a faulty or a change of network switch device 106 and respond to the replacement of the network switch device and reestablish a link with replacement network switch device comprising a connection with principal port 118 of the replacement network switch device. The network storage device 102 may detect such changes using messages from network switch device 104 or other alert techniques. Then, network storage device 102 reselects, from the plurality of initial switch configuration templates 116, an initial switch configuration template 120 associated with replacement network switch device 106. The network storage device 102 retransmits to replacement network switch device 106, through principal port 118, an in-band command with the selected initial switch configuration template 120.

In another example, network storage device 102 may be configured to receive, from network switch device 106, switch type data or information which identifies capabilities of the network switch device. Then, network storage device 102 selects, from the plurality of initial switch configuration templates 116, an initial switch configuration template 120 associated with the network switch device, based on the received switch type.

In another example, network storage device 102 may be configured to respond to receipt of an acknowledgment or message from network switch device 106 after transmission of template 120 to the network switch device. In response, network storage device 102 may cause network switch device 106 to perform a process to configure the switch device with the template and then establish a link to allow communication over network 108 between network host device 104 and network storage device 102. In one example, network storage device 102 sends other acknowledgment messages or responses indicating other information such as the status of the configuration such as successful or unsuccessful switch configuration and the like. In one example, if the response indicates an unsuccessful switch configuration, network storage device 102 may analyze the response and attempt to send a different switch template such as a generic or default switch template to address the situation.

In one example, network storage device 102 may comprise any electronic technique or means to store data for later retrieval. For example, network storage device 102 may include processor readable medium as described below. The network storage device 102 may include storage volumes which may by logical units of data that can be defined across multiple storage devices. The network storage device 102 may receive, from network host devices 104, Input Output (10) requests, through network switch device 106, which may include requests to read data from the network storage device as volumes and requests to write data to the storage devices as volumes. The network storage device 102 may comprise physical storage elements, such as a disk-based storage elements (e.g., hard disk drives, optical disk drives, etc.) or other type of storage elements (e.g., semiconductor storage elements). In one example, multiple storage devices within a storage subsystem can be arranged as an array configuration.

The network host device 104 may include functionality to communicate with other network host devices over network 108 using network and communication techniques. The network techniques may include any means of electronic or data communication. The network 108 may include a local area network, Internet and the like. The network techniques may include Fibre Channel (FC) network, iSCSI (Internet Small Computer System Interface) link, FCoE (Fibre Channel over Ethernet) link and the like. The network techniques also may employ other network components such as switches, expanders, concentrators, routers, and other communications devices. Likewise, network switch device 106 and network storage device 102 may communicate over network 108 using any of the above network techniques.

In one example, network switch device 106 may include functionality for communication between network host device 104 and network storage device 102. In one example, network switch device 106 comprises a FC network switch and principal port 118 that provides a subset of FC port functionality. In one example, a link for communication with network storage device 102 may comprise a FC port on the network storage device, as explained below in further detail.

In one example, system 100 may be employed in a network 108 configured as a switched fabric topology which may include network nodes interconnected via one or more network switch devices 106. The switched fabric networks may spread or distribute network traffic across multiple physical links resulting in high total throughput. One example of a switched fabric topology is FC which is a high-speed network technology that can run or operate at gigabit rates and is often used to implement or deploy Storage Area Networks (SAN) in enterprise storage systems.

In one example, system 100 may be configured to employ FC signaling techniques which may operate or run on an electrical interface in addition to fiber-optic cables. The system 100 may employ Fibre Channel Protocol (FCP) techniques which may comprise a transport protocol (similar to TCP used in IP networks) that can transport SCSI commands over FC networks. The system 100 may include SAN deployments that use FC protocols that may include network host devices 104 (initiating computer system) that access network storage devices 102 (target storage devices) through network switch devices 106 configured as FC fabric switches. The network host devices 104, network switch devices 106, and network storage devices 102 each may perform various corresponding FC functions. For example, network host devices 104 may act as initiators and initiate various requests, such as read/write SCSI requests. The network storage devices 102 may act as target devices and transfer I/O data through Logical Unit Numbers (LUNs). The network switch devices 106 may act as switches and be configured as FC fabric switch devices which may generate the FC fabric to route signals from point-to-point such as from network storage device 102 to network host device 104.

In one example, system 100 may be configured or include functionality to provide communication between network host switches 106 and network storage devices 102 using extensions of FC ports and corresponding signaling. In some implementations, network switch device 106 may include functionality for performing various configuration and operational functions using information exchanged with network storage device 102 over a specialized port. In one example, the specialized port is referred to herein as a principal port such as principal port 118. For example, network switch device 106 may include multiple logical switches, and a subset of the logical switches can be configured as principal ports 118. The network storage device 102 may have established a link to connect to (or communicate with) network switch device 106 by a principal port 118. Once network storage device 102 determines that a port by which it is connected to network switch device 106 is a principal port 118, it can query the network switch device for information such as switch type information that defines or describes the capabilities or functionality of the switch.

For example, network switch device 106 can send or provide to network storage device 102 information that defines the capabilities or functionality of the switch. For example, network switch device 106 can provide switch type information which identifies capabilities of the network switch. The network storage device 102 can then select, from the plurality of initial switch configuration templates 116, an initial switch configuration template 120 associated with the network switch device, based on the received switch type. The initial switch configuration templates 116 may allow a user to customize the templates based on the characteristics of the switch and/or requirements or policies that govern network host device 104, network switch device 106, or network storage device 102. The communication module 110 includes functionality for configuration of communication between network host device 104 and network storage device 102 and configuration and maintenance of network 108 may be automated and simplified, thus helping to reduce manual switch configuration performed by a user or scripted configuration performed by the network host device.

In one example, system 100 may be configured as a SAN with network storage device 102 based configuration of network communication. It should be understood that system 100 of FIG. 1 configured as a SAN may include additional elements and that some of the elements depicted herein may be removed and/or modified without departing from a scope of the SAN. The system 100 configured as a SAN may be used to provide dedicated networks that provides access to consolidated data storage. The SAN may be used to enhance storage devices, such as disk arrays, tape libraries, and optical jukeboxes, accessible to servers so that the devices appear like locally attached devices to the operating system of a computing device. A SAN can include a network of storage devices that are generally not accessible through a Local Area Network (LAN) by other devices.

In one example, a network storage device 102 may be coupled to multiple principal ports 118 and one of the principal ports may be designated or operated as the primary principal port. A primary principal port may be used as the pathway for sending information of network switch device 106, such as switch type, to network storage device 102. The primary principal port may be used to distribute configuration information for all connections between network storage device 102 and network switch device 106. Use of a primary principal port may help reduce bandwidth on the other ports connecting network storage device 102 to network switch device 106. In the event that the primary principal port fails or otherwise becomes unavailable, another principal port may be designated as a backup primary principal port to provide redundancy and to avoid a single points of failure.

In one example, when network storage device 102 determines that it is coupled to network switch device 106 through a principal port, such as principal port 118, then it can perform additional operations through that port to discover the configuration and capabilities of the switch. In example implementations, network storage device 102 may send a query or request command to network switch device 106 through a corresponding principal port 118 for information regarding the capabilities and configuration of the switch. In response to the query, network switch device 106 may respond by sending information such as switch type. As described herein, network storage device 102 may send switch template 120 from a plurality of initial configuration templates 116 to network switch device 106 based on the switch type.

In one example, each of the plurality of initial configuration templates 116 may include information to configure network switch devices 106. In some examples, each of templates 116 may include information such as user defined credentials which may include user name, password, switch management security and the like. The templates 116 may include information related to switch services capability such as Telnet, File Transfer Protocol (FTP), Hypertext Transfer Protocol (HTTP) services and the like. The templates 116 may include network traffic or routing information such as user predefined Priority Flow Control (PFC) for a network switch device configured as Data Center Bridging (DCB) switch, congestion control and network information such as for a Virtual Local Area network (VLAN) or Virtual Storage Area Network (VSAN), and the like.

In other examples, templates 116 may include port configuration information such as user Predefined Port Configurations that specify the configuration and characteristics of the switch ports and the like. In other examples, templates 116 may include information such as Ports Quality of Service (QoS) and Security, Port Initiator Code, Switch Boot from Target, I/O Time Out Settings, Buffer Credit Tuning, and other flags and indicators. In one example Ports QoS and Security information or flag can indicate whether network switch device 106 allows for switch port QoS and security configuration to be pushed or sent from network storage device 102 (target). The Port Initiator Mode indicator can indicate whether network switch device 106 allows for switch port mode configuration changes to be pushed from network storage device 102. The Switch Boot from Target Flag can indicate whether network switch device 106 allows for booting the switch with remote SAN image being pushed through network storage device 102. The I/O Time Out Settings flag can indicate whether an update input/output timeout for particular commands may be pushed through network storage device 102. The Buffer Credit Tuning flag can indicate whether network switch devices 106 can buffer updates for credits for long distances being pushed through network storage device 102.

The network storage device 102 may employ in-band communication to transmit switch templates 116 to network switch device 106 over network 108. The term "in-band" as used herein (e.g., with respect to an in-band command) may refer to communication over a data path of system 100, that is, a channel over which data transfers may be routed. In contrast, the term "out-of-band" may refer to communication over a management path that is separate from the data path. For example, out-of-band communications may carry control signals over an Ethernet connection that is separate from the fabric of network 108. The initial configuration templates 116 may include information to configure network switch devices 106 for initial configuration. In another example, network storage device 102 may include configuration templates or information to configure network switch devices 106 for subsequent configuration after initial configuration.

In one example, network storage device 102 communicates with network switch device 106 over network 108. For example, network storage device 102 transmits in-band commands or messages to network switch device 106 through principal port 118. The network storage device 102 may receive in-band commands or messages or acknowledgments from network switch device 106 through principal port 118. The network storage device 102 transmits initial switch configuration templates 120 using in-band commands. The commands may include information such as Principal Port identifier (which represents the principal port identifier at network storage device 102), Control/Response (which represents the network storage device 102 that is sending control frames), Custom Time Length Value (which represents configuration information for network switch device 106 switch Port/Group of Ports/Switch), and Pay Load (which represents the actual configuration template data which network switch device 106 can parse for configuration purposes).

The system 100 of FIG. 1 shows an example system for switch configuration of network switch device 106 and should be understood that other configurations may be employed to practice the present techniques. For example, system 100 may be configured to include a plurality of network host devices 104 to communicate with a plurality of other network host devices. In another example, network storage device 102 is shown as a single component but it should be understood that network storage device 102 may configured as a plurality of storage devices distributed across network 108. In another example, network switch device 106 is shown as a single component but it should be understood that the switch may configured as a plurality of switch devices distributed across network 108. The components of system 100 may be implemented in hardware, software or a combination thereof. In one example, network storage device 102 may be implemented in hardware, software or a combination thereof. In another example, the functionality of the components of system 100 may be implemented using technology related to Personal Computers (PCs), server computers, tablet computers, mobile computers and the like.

FIG. 1 shows a system 100 to provide for switch configuration of network switch device 106. The system 100 may include processor readable medium comprising (e.g., encoded with) instructions executable by a processor to implement functionalities described herein in relation to FIG. 1. In some examples, the functionalities described herein in relation to instructions to implement switch configuration, and any additional instructions described herein in relation to processor readable medium, may be implemented as engines or modules comprising any combination of hardware and programming to implement the functionalities of the modules or engines, as described herein. The functionality of communication module 110 may be implemented by a computing device which may be a server, blade enclosure, desktop computer, laptop (or notebook) computer, workstation, tablet computer, mobile phone, smart device, or any other processing device or equipment including a processing resource or processor. In examples described herein, a processor may include, for example, one processor or multiple processors included in a single computing device or distributed across multiple computing devices.

Figure 2:
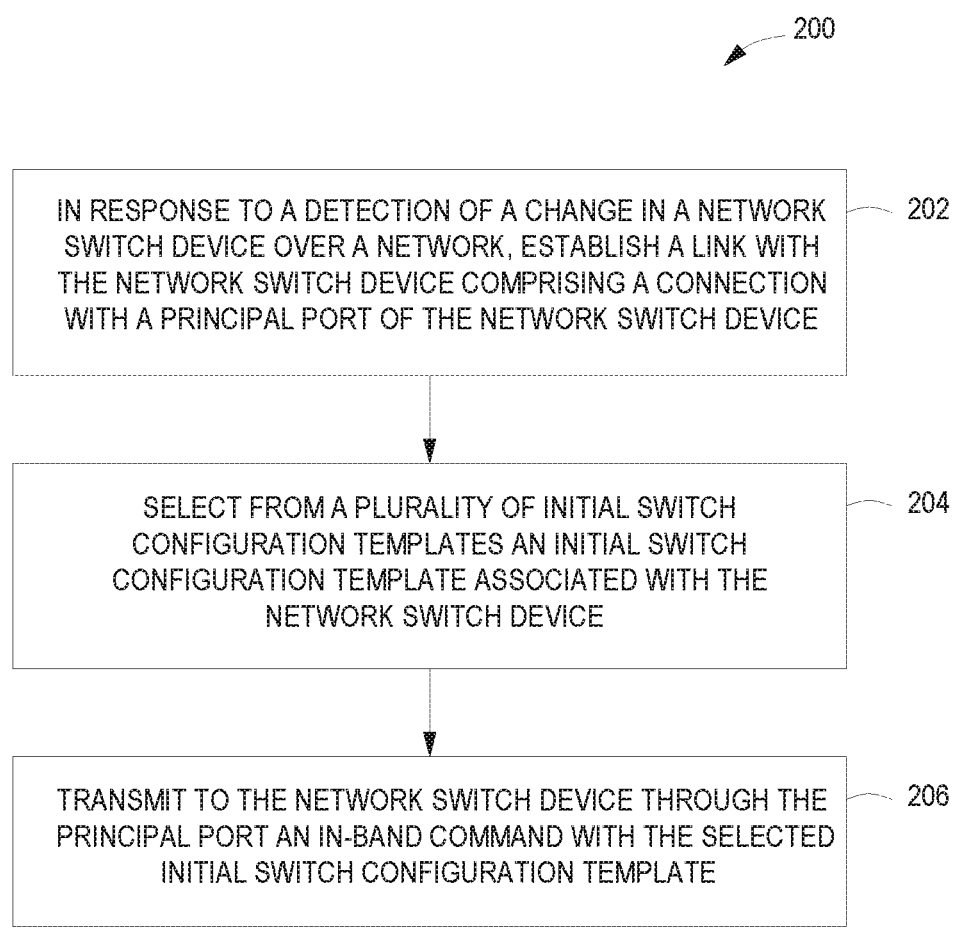
FIG. 2 depicts an example flow chart of a process for switch configuration of network switch devices.

FIG. 2 depicts an example flow chart 200 of switch configuration of network switch device 106. To illustrate operation, it may be assumed that process 200 employs system 100 which includes network storage device 102, network switch device 106 and network host device 104 coupled over network 108 for switch configuration according to the present techniques described herein.

It should be understood the process depicted in FIG. 2 represents generalized illustrations, and that other processes may be added or existing processes may be removed, modified, or rearranged without departing from the scope and spirit of the present disclosure. In addition, it should be understood that the processes may represent instructions stored on a processor readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, Application Specific Integrated Circuits (ASICs), or other hardware components associated with the system. Furthermore, the flow charts are not intended to limit the implementation of the present techniques, but rather the flow charts illustrate functional information to design/fabricate circuits, generate software, or use a combination of hardware and software to perform the illustrated processes.

The process 200 may begin at block 202, where network storage device 102, in response to a detection of a change in network switch device 106 over network 108, establishes a link with the network switch device. In one example, the link comprises a connection with principal port 118 of network switch device 106. Processing proceeds to block 204.

At block 204, network storage device 102 selects from plurality of initial switch configuration templates 116 an initial switch configuration template 120 associated with network switch device 106. Processing proceeds to block 206.

At block 206, network storage device 102 transmits to network switch device 106 through the principal port 118 an in-band command 112 with the selected initial switch configuration template 120. Processing may then terminate, proceed back to block 202 or other processing.

The process 200 of FIG. 2 shows an example process and it should be understood that other configurations may be employed to practice the present techniques described herein. For example, process 200 may be configured to process switch configuration of network switch device 106 from a plurality of network storage devices 102 over a plurality of networks 108.

Figure 3:
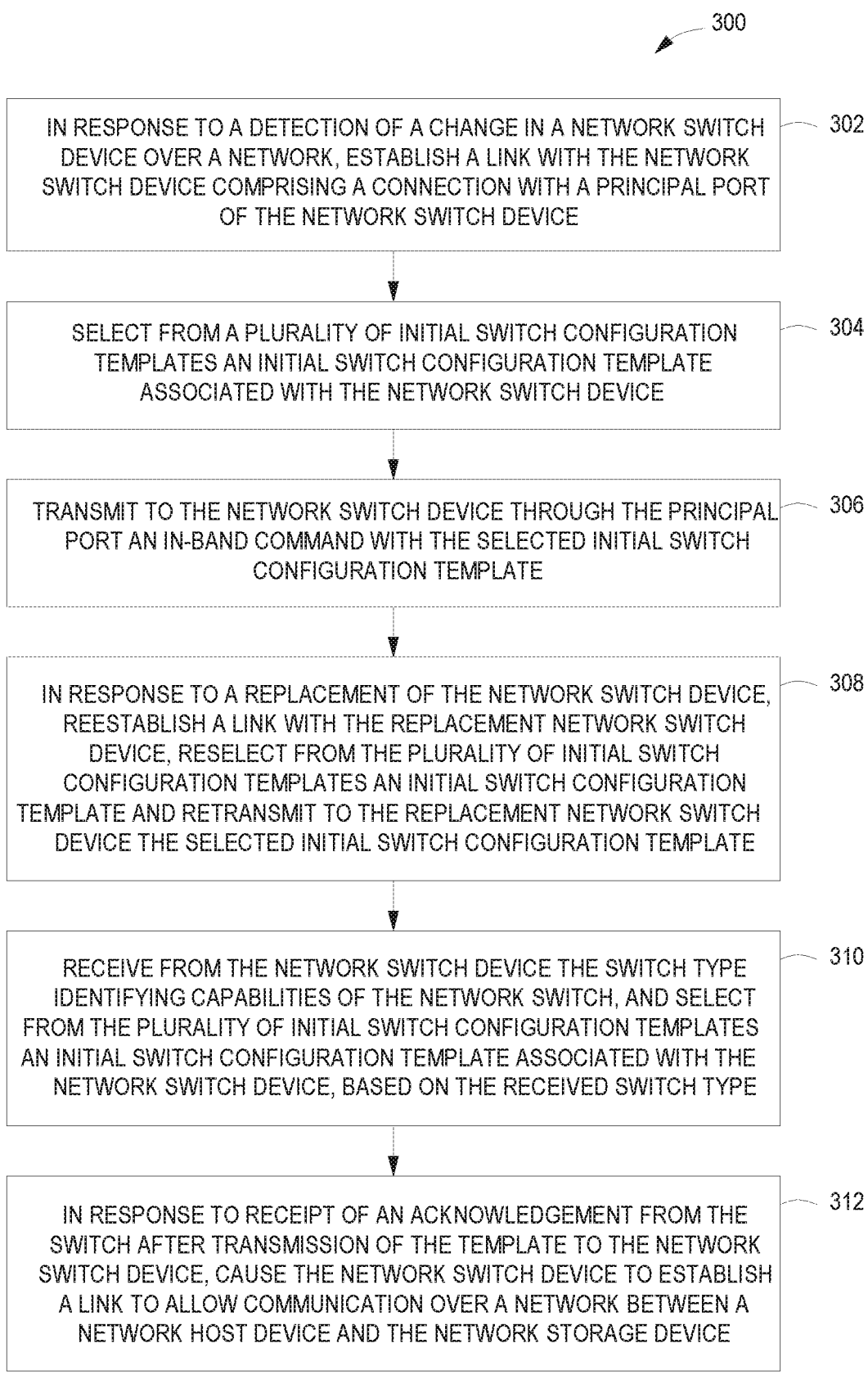
FIG. 3 depicts another example flow chart of a process for switch configuration of network switch devices.

FIG. 3 depicts another example flow chart 300 of switch configuration. To illustrate operation, in one example, it may be assumed that process 300 employs system 100 which includes network storage device 102, network switch device 106 and network host device 104 coupled over network 108 for switch configuration according to the present techniques described herein.

The process 300 includes process blocks 302, 304, 306 which are similar to respective process blocks 202, 204, 206 are not repeated here for simplicity of description.

Processing proceeds to block 308, in one example, where network storage device 102, in response to a replacement of the network switch device 106, the network storage device reestablishes a link with the replacement network switch device comprising a connection with principal port 118 of the replacement network switch device. The network storage device 102 reselects from plurality of initial switch configuration templates 116 an initial switch configuration template 120 associated with replacement network switch device 106. The network storage device 102 retransmits to replacement network switch device 106, through principal port 118, an in-band command with the selected initial switch configuration 120 template. Processing proceeds to block 310.

At block 310, in one example, network storage device 102 receives, from network switch device 106, the switch type identifying capabilities of the network switch. The network storage device 102 selects, from the plurality of initial switch configuration templates 116, an initial switch configuration template 120 associated with the network switch device, based on the received switch type. Processing proceeds to block 312.

At block 312, in one example, network storage device 102, in response to receipt of an acknowledgment from network switch device 106, after transmission of the template to the network switch device, causes the network switch device to establish a link to allow communication over network 108 between network host device 104 and network storage device 102. Then processing may terminate, proceed back to block 302 or proceed to other processing.

The process 300 of FIG. 3 shows an example process and it should be understood that other configurations may be employed to practice the techniques of the present description herein. For example, process 300 may be configured to perform switch configuration of network switch device 106 using a selected configuration template from a plurality of network storage devices 102 over a plurality of networks 108.

Figure 4:
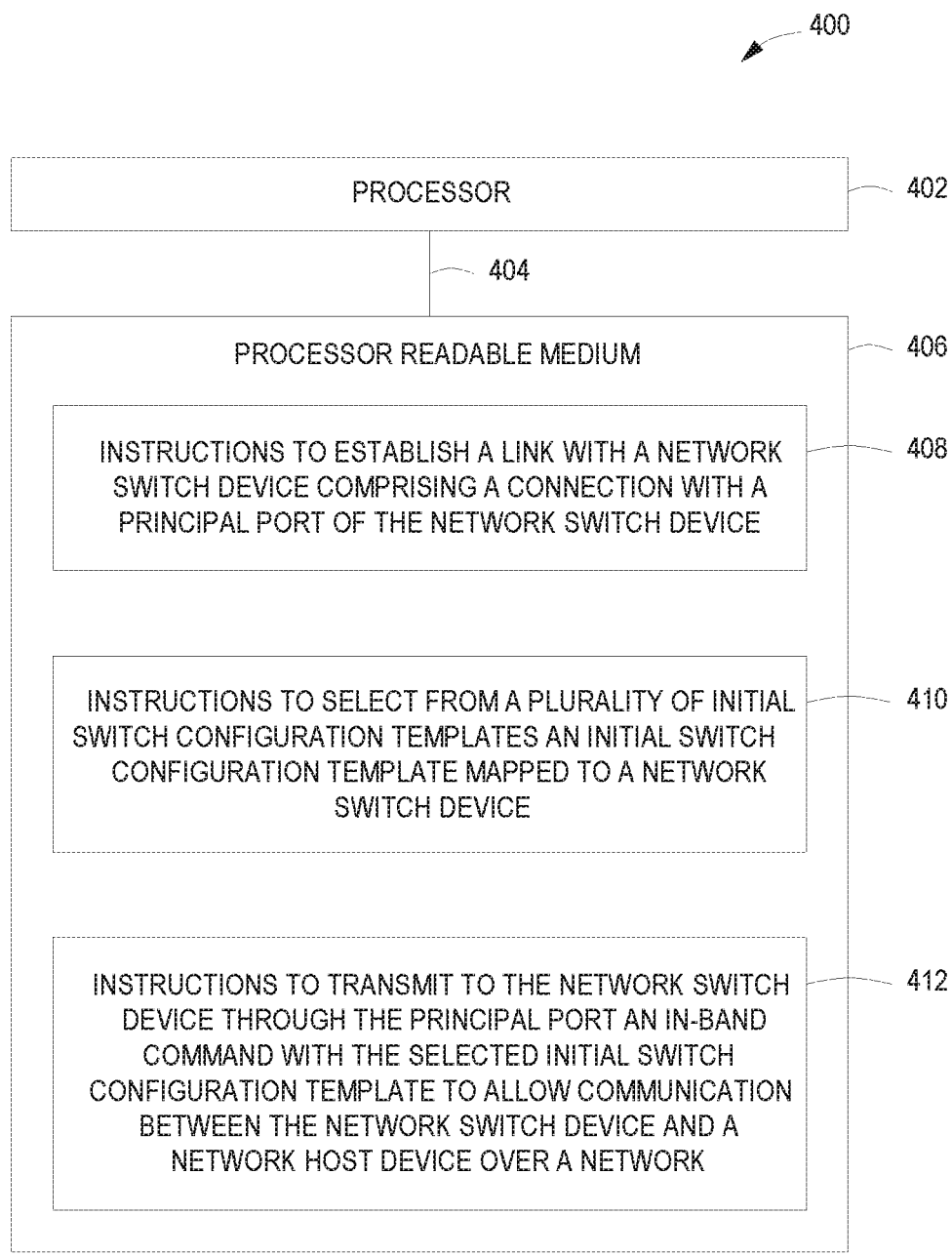
FIG. 4 depicts an example block diagram showing a non-transitory, processor readable medium that stores instructions for switch configuration of network switch devices.

FIG. 4 is an example block diagram 400 showing a non-transitory, processor readable medium that stores instructions for operation in accordance with an example of the techniques of the present disclosure. The non-transitory, processor readable medium is generally referred to by the reference number 406 and may be included in the system in relation to FIG. 1. The non-transitory, processor readable medium 406 may correspond to any typical storage device that stores processor implemented instructions, such as programming code or the like. For example, the non-transitory, processor readable medium 406 may include one or more of a non-volatile memory, a volatile memory, and/or one or more storage devices. Examples of non-volatile memory include, but are not limited to, Electrically Erasable Programmable Read Only Memory (EEPROM) and Read Only Memory (ROM). Examples of volatile memory include, but are not limited to, Static Random Access Memory (SRAM), and Dynamic Random Access Memory (DRAM). Examples of storage devices include, but are not limited to, hard disk drives, compact disc drives, digital versatile disc drives, optical drives, and flash memory devices.

A processor 402 generally retrieves and executes the instructions stored in the non-transitory, processor readable medium 406 to perform the present techniques in accordance with an example. In one example, processor readable medium 406 can be accessed by processor 402 over a bus 404.

The non-transitory, processor readable medium 406 may include instructions to perform functionality as described herein.

For example, block 408 provides instructions to cause network storage device 102 to establish a link with network switch device 106 comprising a connection with principal port 118 of the network switch device.

For example, block 410 provides instructions to cause network storage device 102 to select, from plurality of initial switch configuration templates 116, an initial switch configuration template 120 mapped or corresponding (associated with) to network switch device 106.

For example, block 412 provides instructions to cause network storage device 102 to transmit to network switch device 106, through principal port 118, an in-band command 112 with the selected initial switch configuration template 120 to allow communication between network host device 104 and network storage device 102 over network 108.

The blocks of FIG. 4 show example blocks and it should be understood that other instructions may be employed to practice the techniques of the present disclosure. For example, processor readable medium may include instructions to perform switch configuration of network switch device 106 from a plurality of network storage devices 102 over a plurality of networks 108.

Although shown as contiguous blocks, the software components can be stored in any order or configuration. For example, if the non-transitory, processor readable medium 406 is a hard drive, the software components can be stored in non-contiguous, or even overlapping, sectors.

As used herein, processor 402 may include processor resources such as at least one of a Central Processing Unit (CPU), a semiconductor-based microprocessor, a Graphics Processing Unit (GPU), a Field-Programmable Gate Array (FPGA) configured to retrieve and execute instructions, other electronic circuitry suitable for the retrieval and execution instructions stored on a processor readable medium, or a combination thereof. The processor fetches, decodes, and executes instructions stored on medium 406 to perform the functionalities described below. In other examples, the functionalities of any of the instructions of medium 406 may be implemented in the form of electronic circuitry, in the form of executable instructions encoded on a processor readable storage medium, or a combination thereof.

As used herein, a processor readable medium 406 may be any electronic, magnetic, optical, or other physical storage apparatus to contain or store information such as executable instructions, data, and the like. For example, any processor readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any processor readable medium described herein may be non-transitory. In examples described herein, a processor readable medium or media may be part of an article (or article of manufacture). An article or article of manufacture may refer to any manufactured single component or multiple components. The medium may be located either in the system executing the processor readable instructions, or remote from but accessible to the system (e.g., via a computer network) for execution. In the example of FIG. 4, medium 406 may be implemented by one processor readable medium, or multiple processor readable media.

Figure 5:
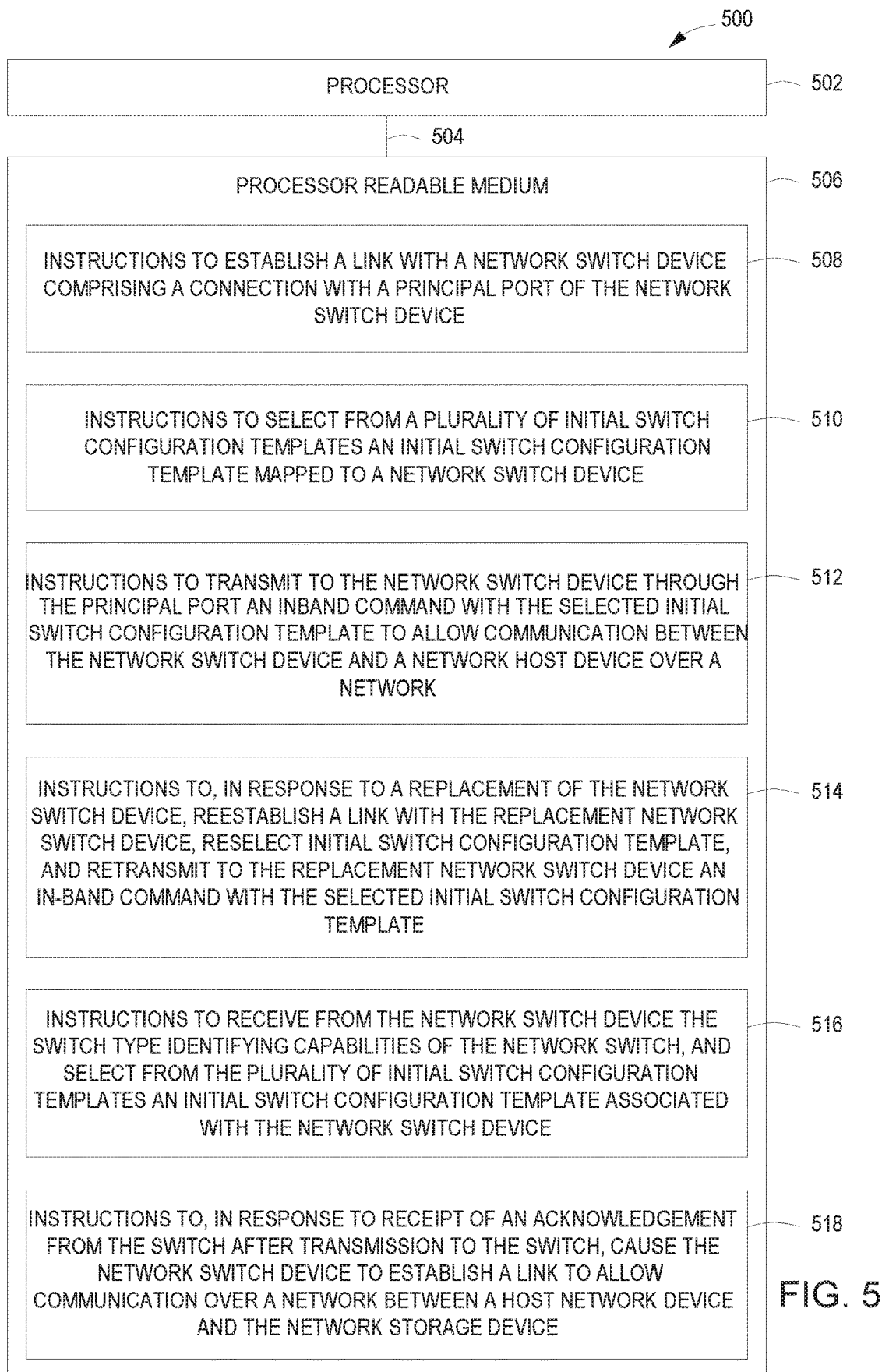
FIG. 5 depicts another example block diagram showing a non-transitory, processor readable medium that stores instructions for switch configuration of network switch devices.

FIG. 5 is an example block diagram 500 showing a non-transitory, processor readable medium that stores instructions for operation in accordance with an example of the techniques of the present disclosure. The non-transitory, processor readable medium is generally referred to by the reference number 506 and may be included in the system in relation to FIG. 1. The components 502, 504, 506 are similar to the components of respective components 402, 404, 406 of FIG. 4 and are not repeated here for simplicity of description.

The non-transitory, processor readable medium 506 may include instructions to perform functionality as described herein. For example, blocks 508, 510, 512 provide instructions similar to instructions of respective blocks 408, 410, 412 of FIG. 4 and are not repeated here for simplicity.

In one example, block 514 provides instructions to, in which network storage device 102, in response to a replacement of network switch device 106, reestablishes a link with the replacement network switch device comprising a connection with principal port 118 of the replacement network switch device. The instructions include to reselect, from the plurality of initial switch configuration templates 116, an initial switch configuration template 120 associated with the replacement network switch device. The instructions include to retransmit to replacement network switch device 106, through principal port 118, an in-band command 112 with selected initial switch configuration template 120.

For example, block 516 provides instructions to receive from network switch device 106 a switch type identifying capabilities of the network switch. The instructions select, from plurality of initial switch configuration templates 116, an initial switch configuration template 120 associated with the network switch device, based on the received switch type.

For example, block 518 provides instructions to, in response to receipt of an acknowledgment from network switch device 106, after transmission to the switch, to cause the network switch device to establish a link to allow communication over network 108 between the host network device 104 and network storage device 102.

The foregoing describes a novel and previously unforeseen approaches. While the above disclosure has been shown and described with reference to the foregoing examples, it should be understood that other forms, details, and implementations may be made without departing from the spirit and scope of this disclosure.

What is claimed is:

1. A network storage device comprising:
a memory module to store a plurality of initial switch device configuration templates associated with network switch devices; and
a communication module to:
establish a link with a network switch device comprising a connection with a principal port of the network switch device,
select, from the plurality of initial switch configuration templates, an initial switch configuration template associated with the network switch device; and
transmit to the network switch device, through the principal port, an in-band command with the selected initial switch configuration template.

2. The network storage device of claim 1, wherein the communication module is to, in response to a replacement of the network switch device with a replacement network switch device:
establish a link with the replacement network switch device comprising a connection with a principal port of the replacement network switch device
reselect, from the plurality of initial switch configuration templates, a further switch configuration template associated with the replacement network switch device; and
transmit, to the replacement network switch device through the principal port of the replacement network switch device, an in-band command with the further switch configuration template.

3. The network storage device of claim 1, wherein the communication module is to:
request a switch type from the network switch device; and
receive from the network switch device the switch type indicating capabilities of the network switch device,
wherein the selecting, from the plurality of initial switch configuration templates, the initial switch configuration template is based on the received switch type.

4. The network storage device of claim 1, wherein the communication module is to:
in response to receipt of an acknowledgment from the network switch device after transmission of the selected initial switch configuration template to the network switch device, cause the network switch device to establish a link to allow communication over a network between a network host device and the network storage device.

5. The network storage device of claim 1, wherein the network switch device comprises a Fibre Channel switch and the principal port is to provide a Fibre Channel functionality.

6. A method comprising:
in response to a detection, over a network, of a change of a network switch device, establishing, by a first device, a link over the network with the network switch device, the link comprising a connection with a principal port of the network switch device;
selecting, from a plurality of switch configuration templates stored in a storage of the first device, a selected switch configuration template associated with the network switch device; and
transmitting, by the first device to the network switch device through the principal port, an in-band command with the selected switch configuration template.

7. The method of claim 6, further comprising, in response to a replacement of the network switch device with a replacement network switch device:
- establishing, by the first device, a link over the network with the replacement network switch device, the link with the replacement network switch device comprising a connection with a principal port of the replacement network switch device;
- reselecting, by the first device from the plurality of switch configuration templates, a further switch configuration template associated with the replacement network switch device; and
- transmitting, by the first device to the replacement network switch device through the principal port of the replacement network switch device, an in-band command with the further switch configuration template.

8. The method of claim 6, further comprising:
- requesting, by the first device, information of a switch type from the network switch device; and
- receiving, by the first device from the network switch device, the information of the switch type indicating capabilities of the network switch device,
- wherein the selecting, from the plurality of switch configuration templates, of the selected switch configuration template is based on the received information of the switch type.

9. The method of claim 6, further comprising:
- in response to receipt of an acknowledgment from the network switch device after transmission of the selected switch configuration template to the network switch device, causing, by the first device, the network switch device to establish a link to allow communication through the network switch device between a network host device and the first device.

10. The method of claim 9, wherein the principal port provides a subset of Fibre Channel port functionality, and the network switch device is to provide Fibre Channel communications between the network host device and the first device.

11. A non-transitory machine-readable medium comprising instructions that upon execution cause a network storage device to:
- establish a link over a network with a network switch device, the link comprising a connection with a port of the network switch device;
- select, from a plurality of switch configuration templates stored in a storage of the network storage device, a selected switch configuration template mapped to the network switch device; and
- transmit, to the network switch device through the port, an in-band command with the selected switch configuration template to allow communication between the network switch device and a network host device over the network.

12. The non-transitory machine-readable medium of claim 11, further comprising instructions that upon execution cause the network storage device to, in response to a replacement of the network switch device with a replacement network switch device:
- establish a link with the replacement network switch device, the link with the replacement network switch device comprising a connection with a port of the replacement network switch device;
- reselect, from the plurality of switch configuration templates, a further switch configuration template associated with the replacement network switch device, and
- transmit, to the replacement network switch device through the port of the replacement network switch device, an in-band command with the further switch configuration template.

13. The non-transitory machine-readable medium of claim 11, further comprising instructions that upon execution cause the network storage device to:
- receive, from the network switch device, information of a switch type identify capabilities of the network switch device,
- wherein the selecting, from the plurality of switch configuration templates, of the selected switch configuration template associated with the is based on the received information of the switch type.

14. The non-transitory machine-readable medium of claim 11, further comprising instructions that upon execution cause the network storage device to:
- in response to receipt of an acknowledgment from the network switch device after transmission of the selected switch configuration template to the network switch device, cause the network switch device to establish a link to allow communication over the network between the network host device and the network storage device.

15. The non-transitory machine-readable medium of claim 11, wherein the port is to provide a Fibre Channel port functionality, and the link with the network storage device is a Fibre Channel device.

16. The method of claim 9, wherein the first device is a network storage device, and wherein the network host device is an initiator to initiate a data read or data write with the network storage device through the network switch device.

17. The method of claim 6, wherein the first device comprises a network storage device that is a target for reads and writes from an initiator device, and wherein the transmitting of the in-band command with the selected switch configuration template pushes the selected switch configuration template from the target to the network switch device.

18. The network storage device of claim 4, wherein the network host device is an initiator to initiate a data read or data write with the network storage device through the network switch device.

19. The network storage device of claim 1, wherein the network storage device is a target for reads and writes from an initiator device, and wherein the transmitting of the in-band command with the selected initial switch configuration template pushes the selected initial switch configuration template from the target to the network switch device.

20. The non-transitory machine-readable medium of claim 11, wherein the network storage device is a target for reads and writes from the network host device as an initiator, and wherein the transmitting of the in-band command with the selected switch configuration template pushes the selected initial switch configuration template from the target to the network switch device.

* * * * *